Feb. 22, 1927.　　　B. W. KADEL　　　1,618,830
FRICTION DRAFT GEAR
Filed Jan. 12, 1924　　2 Sheets-Sheet 1
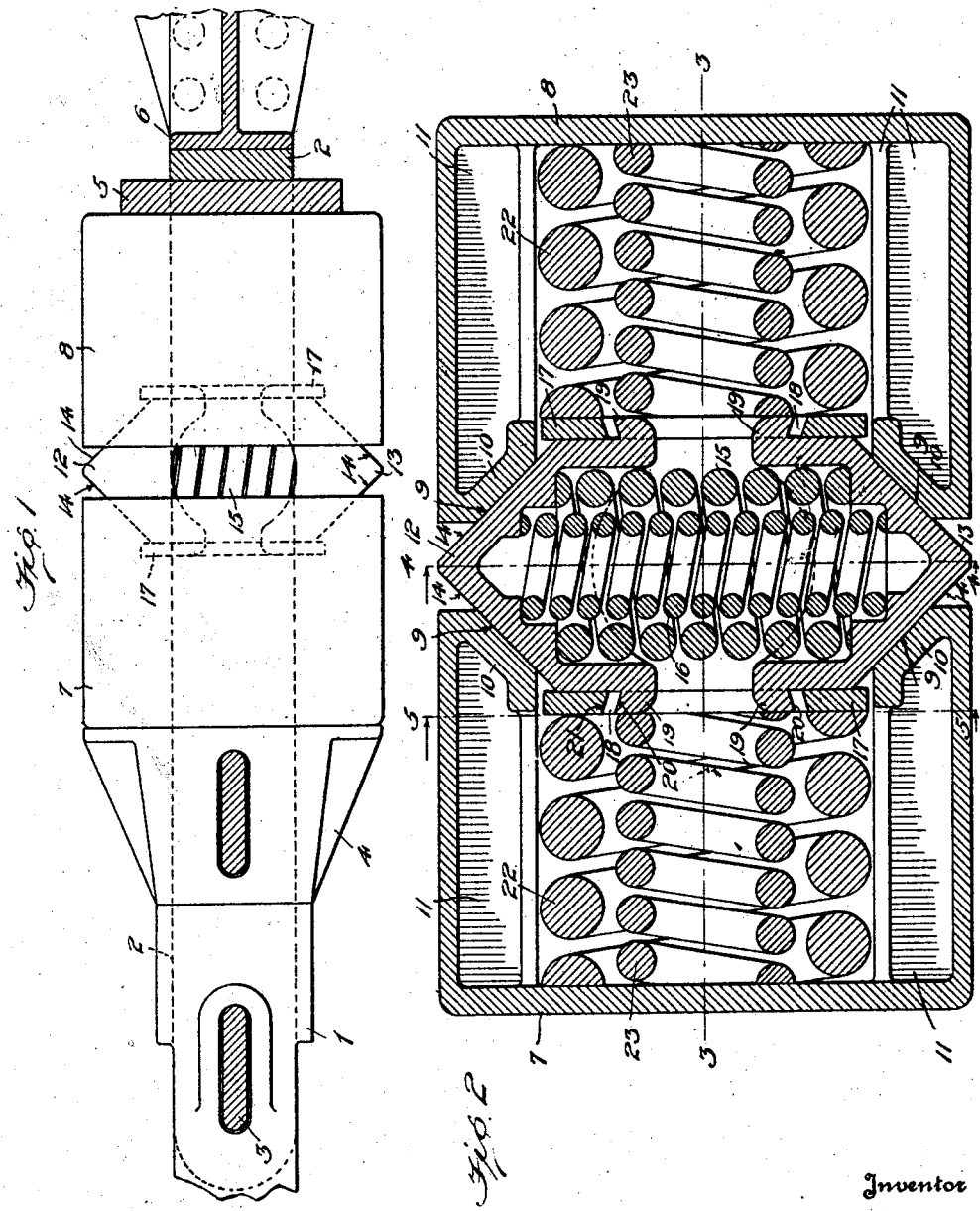
Inventor
Byers W. Kadel
By Ernest F. Mechlin
his Attorney Feb. 22, 1927.

B. W. KADEL 1,618,830

FRICTION DRAFT GEAR

Filed Jan. 12, 1924    2 Sheets-Sheet 2

Inventor
Byers W. Kadel
By Ernest F. Mechlin
his Attorney

Patented Feb. 22, 1927.

1,618,830

UNITED STATES PATENT OFFICE.

BYERS W. KADEL, OF BALTIMORE, MARYLAND, ASSIGNOR, BY MESNE ASSIGNMENTS, TO THE SYMINGTON COMPANY, OF NEW YORK, N. Y., A CORPORATION OF MARYLAND.

FRICTION DRAFT GEAR.

Application filed January 12, 1924. Serial No. 685,901.

The invention relates to railway draft rigging.

One of the principal features of the present invention, broadly stated, is to provide a friction draft gear of strong and economical construction primarily adapted for light capacity cars, although it is not limited to such use only.

Particularly stated, the invention contemplates a plurality of casings each having friction faces thereon, and a plurality of friction members or shoes arranged between said casings, said shoes being maintained in contact with the casings by a spring transversely disposed with relation to the springs arranged between the shoes and casings for receiving the initial shocks, said friction shoes being connected by means interposed therebetween and the last named springs whereby in addition to the frictional resistance between the casings and friction shoes there is developed a comparatively large frictional resistance between the friction shoes and the means connecting the same.

Another object of the invention is to provide a friction draft gear in which the friction members are advantageously connected transversely of the draft rigging, the means connecting said friction members acting to permit relative movement therebetween and also serving to maintain them in assembled position when removed from the draft rigging, said means also operating as a friction member for increasing the frictional resistance of the draft gear.

A still further object of the invention is to provide a friction shock absorbing mechanism for railway draft rigging involving a plurality of casings each having friction faces, and a plurality of friction shoes having friction faces cooperating with the friction faces of the casings, means connecting the friction shoes for movement transversely of the draft rigging, said means involving slotted plate members adapted to limit the outward movement of the friction shoes and coacting therewith for developing increased frictional resistance within the mechanism.

In the drawings illustrating the invention, the scope whereof is pointed out in the appended claims:

Figure 1 is a view in side elevation of my improved shock absorbing mechanism embodied in a railway draft rigging of the Farlow type.

Figure 2 is a vertical longitudinal sectional view on an enlarged scale of the shock absorbing or cushioning mechanism removed from the draft rigging.

Figure 3:
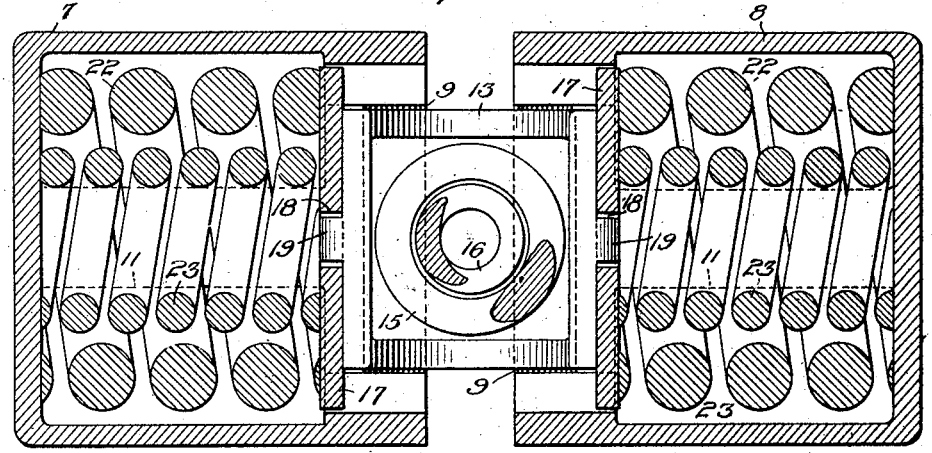
Figure 3 is a horizontal longitudinal sectional view on the line 3—3 of Figure 2.
Figure 4:
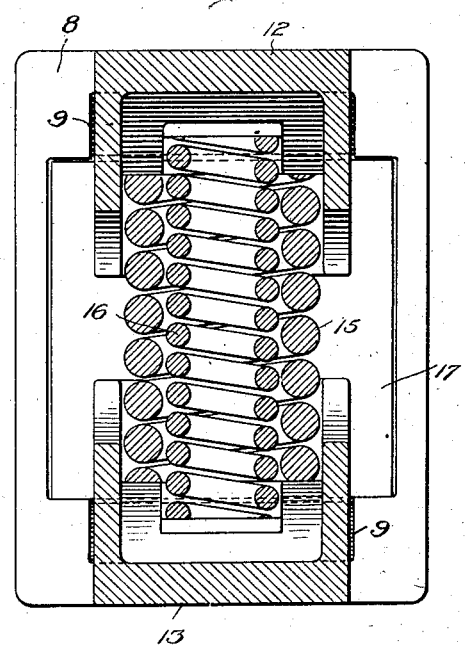
Figure 4 is a vertical transverse sectional view on the line 4—4 of Figure 2.
Figure 5:
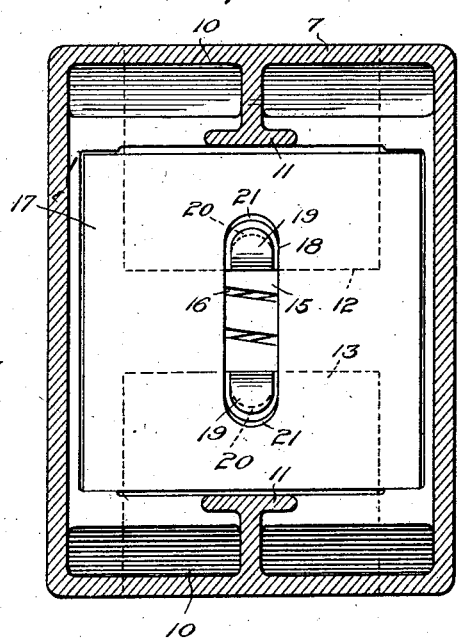
Figure 5 is a vertical transverse sectional view on the line 5—5 of Figure 2.

Referring to the drawings in which similar reference characters designate corresponding parts in the several views, my improved construction of friction draft gear is shown applied to a draft rigging of the Farlow type in which the coupler 1 is shown connected to the yoke 2 by means of a key 3. A key-connected follower 4 is shown interposed between the butt of the coupler and one casing of the draft gear, and a rear follower 5 is shown interposed between the rear casing of the draft gear and the yoke. A back stop member is shown at 6.

The friction draft gear comprises a plurality of casings 7 and 8 each having oppositely disposed inclined friction faces 9. The friction faces 9 are formed on the wall portions 10 of each casing, said wall portions being suitably reinforced by longitudinally extending flanged webs 11.

Interposed between the casings 7 and 8 is a plurality of friction shoes 12 and 13, each of said friction shoes having inclined friction faces 14 adapted to coact respectively with the friction faces on the casings. The friction shoes are maintained in contact with the friction faces of the casings by means of a relatively heavy spring 15 and a lighter spring 16, both of said springs seating upon suitable shoulder portions of the respective shoes, as shown. The friction shoes are connected by means including plates 17, said plates being slotted, as at 18, and operating in the nature of link members for maintaining the shoes in assembled relation when removed from the draft rigging but also permitting relative movement of said shoes when interposed between the casings. Each friction shoe is provided with a plurality of projections 19, said projections extending into the slots of the respective plates 17 which latter operate to limit the outward or transverse movement of said shoes with respect to the draft rigging in which the gear is positioned. The projections 19 are preferably provided with angular faces 20 adapted to coact with similarly inclined faces 21 provided at each end of the slot in the plates 17.

The plates 17 are interposed between the friction shoes and the relatively heavy spring 22 mounted within each casing, said plates operating as friction elements in conjunction with the friction shoes for increasing the frictional resistance of the draft gear. The plates 17 may be termed spring plates in that the heavy springs 22 bear directly upon said plates in transmitting the loads. Relatively light springs 23 are also provided within the casings, said springs bearing against the plates 17, as shown.

In operation it will be observed that as the casings or housings approach each other, the wedge action causes the friction members to approach each other transversely of the gear. This approach movement is resisted by the transversely arranged springs which react against the two center friction members. The main longitudinal springs are also effective in producing friction as the resistance of these springs causes a heavy friction to develop between the ends of the friction members and the spring plates upon which the main springs seat. It will also be noted that in removing the friction elements from the draft gear, that the plate members 17 operate to hold the same in assembled position thereby producing a very convenient construction.

I claim:

1. In a railway draft rigging, the combination with draft sills, of a yoke, a coupler connected to said yoke, and a cushioning mechanism comprising complementary casings each having an inclined face, a plurality of friction elements each provided with a friction face cooperating with an adjacent inclined face on the casings, a spring interposed between said friction elements, a spring interposed between said friction elements and each of the adjacent casings, and means between said last mentioned springs and elements, and connecting said elements, said means acting to permit relative movement between them and also serving to maintain them in assembled relation when removed from the draft rigging.

2. In a draft rigging, the combination with draft sills, of a yoke, a coupler connected to said yoke, and a cushioning mechanism including casings having inclined faces, a plurality of friction elements, each having friction faces cooperating respectively with the inclined faces of said casings, a spring interposed between said friction elements, a spring interposed between each casing and friction element, and means frictionally engaging and connecting said friction elements, said means acting to maintain them in assembled relation when removed from the draft rigging and increase the capacity of the mechanism.

3. In a draft rigging, the combination with draft sills, of a yoke, a coupler connected to said yoke, a cushioning mechanism comprising spaced casings each having a plurality of inclined faces thereon, a plurality of friction shoes each provided with a plurality of friction faces cooperating respectively with the inclined faces on said casings, a spring interposed between said friction shoes, a spring interposed between each casing and said friction shoes, and means connecting said friction shoes, said means being spring pressed against the friction shoes acting to permit relative movement therebetween and also serving to maintain the same in assembled position when removed from the draft rigging.

4. A draft gear comprising a plurality of casings each having a plurality of friction faces, a plurality of friction shoes each having a plurality of friction faces adapted to cooperate respectively with the friction faces on said casings, a spring interposed between said shoes, a spring interposed between each casing and said friction shoes, and means spring pressed against and connecting said friction shoes, and acting to maintain them in assembled relation when removed from the gear.

5. A draft gear comprising a plurality of casings each having a plurality of friction faces, a plurality of friction shoes each having a plurality of friction faces adapted to cooperate respectively with the friction faces on said casings, a spring interposed between said shoes, a spring interposed between each casing and said friction shoes, and means including a link member on either side of and connecting said friction shoes, said member permitting relative movement of the friction shoes when positioned in the draft rigging and also serving to maintain them in assembled position when removed from the gear.

6. A draft gear comprising spaced casings each having a plurality of oppositely inclined friction faces, a plurality of friction shoes interposed between said casings, said shoes each having a plurality of friction faces adapted to coact respectively with the friction faces on said casings, spring means interposed between said friction shoes, spring means disposed between each casing and said shoes, and means positioned between said last mentioned spring means and shoes for increasing the capacity of the gear and maintaining said shoes in assembled position when removed from between the casings.

7. A friction shock absorbing mechanism for railway draft rigging comprising spaced casings each having a plurality of oppositely inclined friction faces, a plurality of friction shoes interposed between said casings, said shoes having a plurality of friction faces adapted to coact respectively with the friction faces on said casings, a spring interposed between said friction shoes, a spring arranged between each casing and said shoes, and means adapted to connect said shoes and maintain them in assembled position when removed from between the casings, said means being interposed between the spring arranged within each casing and the friction shoes.

8. A friction shock absorbing mechanism for railway draft rigging comprising spaced casings each having a plurality of oppositely inclined friction faces, a plurality of friction shoes interposed between said casings, said shoes having a plurality of friction faces adapted to coact respectively with the friction faces on said casings, a spring interposed between said friction shoes, a spring arranged between each casing and said shoes, and slotted means connecting said friction shoes for maintaining them in assembled relation when removed from between the casings, said means also permitting relative movement of the friction shoes when in operative position between said casings.

9. A friction shock absorbing mechanism for railway draft rigging comprising spaced casings each having a plurality of oppositely inclined friction faces, a plurality of friction shoes interposed between said casings, said shoes each having a plurality of friction faces adapted to coact respectively with the friction faces on said casings, a spring interposed between said friction shoes, a spring arranged between each casing and said friction shoes, projections on said shoes and slotted plate means adapted to receive the projections on said shoes for limiting the relative outward movement thereof for permitting their movement transversely of the draft rigging.

10. A shock absorbing mechanism for railway draft rigging comprising spaced casings each having a plurality of oppositely inclined friction faces, a plurality of friction shoes interposed between said casings, said shoes having friction faces coacting respectively with the inclined faces on said casings, a plurality of plates connecting said friction shoes, adapted to permit movement of the shoes transversely of the draft rigging, a spring interposed between said friction shoes, and a spring interposed between said plates and each casing.

11. A friction shock absorbing mechanism for railway draft rigging comprising spaced casings each having a plurality of friction faces, a plurality of friction shoes interposed between said casings, said shoes each having friction faces coacting respectively with the friction faces on said casings, means including a plurality of plates with transverse faces frictionally contacting said shoes and permitting relative movement thereof transversely of the draft rigging, means for maintaining said friction shoes in contact with the casings, and means for maintaining the plates in frictional engagement with said shoes, said means including springs.

12. A cushioning mechanism comprising a plurality of casings having opposed friction faces, a plurality of friction shoes having faces cooperating with the faces on said casings, means connecting said friction shoes, said means permitting relative movement of the friction shoes transversely of the casings, and means including a spring interposed between said casings and said last named means for frictionally maintaining the means connecting the friction shoes in frictional engagement therewith.

13. A friction shock absorbing mechanism for railway draft rigging comprising spaced casings each having a plurality of friction faces, a plurality of friction members having faces cooperating with the faces on said casings, means connecting said friction members for movement transversely of the draft rigging, and means for maintaining said last named means in frictional engagement with said shoes for increasing the capacity of said mechanism.

In testimony whereof I affix my signature.

BYERS W. KADEL.